United States Patent [19]
Scott

[11] Patent Number: 5,648,433
[45] Date of Patent: Jul. 15, 1997

[54] TERNARY POLYETHERIMIDE/POLYESTER/POLYESTER BLENDS

[75] Inventor: Christopher E. Scott, Kingsport, Tenn.

[73] Assignee: Eastman Chemical Company, Kingsport, Tenn.

[21] Appl. No.: 558,765

[22] Filed: Nov. 15, 1995

Related U.S. Application Data

[63] Continuation of Ser. No. 251,169, May 31, 1994, abandoned.

[51] Int. Cl.$^6$ .................................................. C08L 79/08
[52] U.S. Cl. .................................................. 525/425; 525/436
[58] Field of Search .......................... 525/425, 444, 525/436

[56] References Cited

U.S. PATENT DOCUMENTS

| | | | |
|---|---|---|---|
| 3,847,867 | 11/1974 | Heath et al. | 528/26 |
| 3,847,869 | 11/1974 | Williams | 528/170 |
| 3,850,885 | 11/1974 | Takekoshi et al. | 528/170 |
| 3,852,242 | 12/1974 | White | 528/170 |
| 3,855,178 | 12/1974 | White et al. | 524/392 |
| 3,887,588 | 6/1975 | Cook et al. | 549/243 |
| 4,017,511 | 4/1977 | Williams, III | 548/461 |
| 4,024,110 | 5/1977 | Takekoshi | 528/170 |
| 4,141,927 | 2/1979 | White et al. | 525/432 |
| 4,687,819 | 8/1987 | Quinn et al. | 525/425 |
| 4,835,047 | 5/1989 | Isayer et al. | 428/294 |
| 4,908,418 | 3/1990 | Holub | 525/425 |
| 4,908,419 | 3/1990 | Holub et al. | 525/425 |
| 5,284,903 | 2/1994 | Minnick | 524/538 |
| 5,306,785 | 4/1994 | Borman et al. | 525/425 |

*Primary Examiner*—Ana Woodward
*Attorney, Agent, or Firm*—Betty J. Boshears; Harry J. Gwinnell

[57] ABSTRACT

This invention relates to:

a visually clear blend of thermoplastic polymers comprising:

(A) a polyetherimide, (B) a mixture of polyesters comprising:
  (1) a polyester comprising repeat units from:
    (a) 2,6-naphthalene dicarboxylic acid and
    (b) ethylene glycol
  (2) a polyester comprising repeat units from:
    (a) an acid selected from the group consisting of terephthalic acid and isophthalic acid or mixtures thereof, and
    (b) a glycol selected from the group consisting of ethylene glycol, 1,4-cyclohexanedimethanol or a mixture thereof.

22 Claims, 1 Drawing Sheet

Fig. 1

TERNARY POLYETHERIMIDE/POLYESTER/POLYESTER BLENDS

This is a continuation of copending application Ser. No. 08/251,169 filed on May 31, 1994, now abandoned.

RELATED APPLICATIONS

This application is related to U.S. Ser. No. 08/251,149 filed on even date herewith, entitled "Blends of Polyetherimides with Polyesters of 2,6-Naphthalenedicarboxylic Acid".

1. Field of the Invention

This invention relates to blends of thermoplastic polymers which form a single phase solid solution of excellent optical properties.

2. Background of the Invention

Polyesters and copolyesters are useful materials for injection molding and extrusion. However, for many applications, higher flexural moduli, flexural strength, and heat deflection temperatures are required. One useful method for the achievement of these desired properties is blending of polyesters with other polymers. However, blends with other polymers are often opaque and therefore not useful in applications where clarity is required. Polyetherimides are excellent high temperature plastics. However, very high melt temperatures are often required to process them.

U.S. Pat. No. 4,141,927 to White et al. discloses blends of polyetherimides and of polyesters based primarily on terephthalic acid and isophthalic acid. The patent discloses blends which formed multiple phase solid state solutions in the composition range from about 25 to 90 weight percent polyester. Such compositions are understood to be opaque or cloudy.

Blends of polyarylates with polyetherimide are disclosed in the United States Patent to Robeson, et al., and U.S. Pat. No. 4,908,419 to Holub et al. Three component blends of polyetherimide, polyester and a third polymer are also disclosed in U.S. Pat. No. 4,687,819 to Quinn et al. and U.S. Pat. No. 4,908,418 to Holub. None of these patents suggests a polymer composition having the combination of desired flexural properties, clarity and transparency.

There is a continuing need for thermoplastic polymer compositions that have high flexural moduli, high flexural strength and high heat deflection temperatures and that can be injection molded or extruded to form articles of excellent clarity and transparency.

SUMMARY OF THE INVENTION

This invention relates to visually clear blends of thermoplastic polymers comprising:

(1)(A) a polyetherimide, (B) a mixture of polyesters comprising:

(1) a polyester comprising repeat units from:
  (a) 2,6-naphthalene dicarboxylic acid and
  (b) ethylene glycol (2) a polyester comprising repeat units from:
  (a) an acid selected from the group consisting of terephthalic acid and isophthalic acid or mixtures thereof, and
  (b) a glycol selected from the group consisting of ethylene glycol, 1,4-cyclohexanedimethanol or a mixture thereof.

The blends of the invention are unexpectedly clear. Clarity here indicates specifically transparency to light. The blends may or may not exhibit color.

The polyester of (1)(B)(2) above is preferably based on terephthalic acid, i.e., poly(ethylene terephthalate) (PET), poly(cyclohexane-1,4-dimethylene terephthalate) (PCT) or a copolyester of poly(ethylene-co-cyclohexane-1,4-dimethylene terephthalate) (PET-co-PCT).

DESCRIPTION OF THE INVENTION

As used herein, the term "polyester" means a polyester of a single dicarboxylic acid and a single glycol or a co-polyester of one or more dicarboxylic acids and one or more glycols. The term "dicarboxylic acid component or acid component" or mixture of acids (or their equivalent esters, anhydrides or halides) which react with a glycol or glycols to form a polyester. Similarly, the term "glycol component" means the glycol or glycols which react with such acid or acids (or their equivalent esters, anhydrides, or halides) to form the polyester.

The novel polyetherimide/polyester/polyester blends of this invention comprise polyetherimide (1)(A), polyester (1)B(1) and polyester (1)B(2) as follows.

(A) about 5 to about 99 wt % of polyetherimide of the formula where n represents a whole number in excess of 1, for example 10 to 10,000 or more, wherein the radical —O—R—O— is in the 3- or 4- and 3'- or 4'-positions.

The radical —R— is a member of the class consisting of and where m is 0 or 1 and Q is a member selected from the class consisting of divalent radicals of the formulas

$$-O-, \quad -\overset{O}{\underset{\|}{C}}-, \quad -\overset{O}{\underset{\underset{\|}{O}}{\overset{\|}{S}}}-, \quad -S-,$$

and $-C_x-H_{2x}-$.

and x is a whole number from 1 to 5, inclusive.

The radical —R'— is a divalent organic radical selected from the class consisting of (1) aromatic hydrocarbon radicals having from 6 to 20 carbon atoms and halogenated derivatives thereof:
(2) alkylene radicals and cycloalkylene radicals having from 2 to 20 carbon atoms; and
(3) radicals described by the formula:

where R" is a member selected from the class consisting of:

$$-O-, \quad -\overset{O}{\underset{\|}{C}}-, \quad -\overset{O}{\underset{\underset{\|}{O}}{\overset{\|}{S}}}-, \quad -S-,$$

and $-C_y-H_{2y}-$.

and y is a whole number from 1 to 5, inclusive.

It is preferred that the radical —R— is a member of the class consisting of:

where Q is a divalent radical of the formula

$$-O-, \quad -\overset{O}{\underset{\|}{C}}-, \quad \text{or} \quad -C_xH_{2x}-; \quad \text{and}$$

$$R" \text{ is } \quad -O-, \quad -\overset{O}{\underset{\|}{C}}-, \quad \text{or} \quad -C_yH_{2y}-$$

wherein x and y are defined herein.

It is also preferred that the radical —R— is

Q is a divalent radical of the formula $-C_xH_{2x}$, and R" is a divalent radical of the formula $-C_yH_{2y}$; wherein x and y are defined herein.

It is more preferred that the radical —R— is

—R— is a divalent organic radical selected from the class consisting of: (1) aromatic hydrocarbon radicals having from 6 to 10 carbon atoms; and (2) alkylene radicals and cycloalkylene radicals having from 2 to 10 carbon atoms.

It is even more preferred R' of the polyetherimide is

The novel polyetherimide/polyester/polyester blends of this invention also comprise:
about 99 to about 5 wt % of a mixture of:

(1)(B)(1) a polyester (PEN) comprising repeat units from
  (a) 2,6-naphthalenedicarboxylic acid and
  (b) ethylene glycol, and
(1)(B)(2) a polyester comprising repeat units from:
  (a) an acid selected from the group consisting of terephthalic acid and isophthalic acid or mixtures thereof, preferably terephthalic acid, and
  (b) a glycol selected from the group consisting of ethylene glycol (EG), 1,4-cyclohexanedimethanol (CG) or a mixture of EG and CG.

The poly(ethylene 2,6-naphthalenedicarboxylate) (PEN) or polyester (1)(B)(1) referred to above is a polyester having repeat units from 2,6-naphthalene dicarboxylic acid and ethylene glycol, and is produced by conventional techniques. The I.V. of this polymer should be within the range of about 0.2 to about 1.0, preferably 0.4 to 0.8 dL/g.

Polyester (1)B(2) referred to above is a polyester having repeat units from terephthalic acid, and either ethylene glycol, 1,4-cyclohexanedimethanol, or a mixture of ethylene glycol and 1,4-cyclohexanedimethanol. The mole % of repeat units from these two glycols is described herein. These polyesters can be prepared by direct condensation of the acid with the glycol or ester interchange using a lower alkyl ester such as dimethyl terephthalate. The essential components of the polyester are commercially available.

In addition, polyesters (1)(B)(1) and (1)(B)(2) may be modified by other acids or a mixture of acids including, but not limited to:

terephthalic acid
 isophthalic acid
 phthalic acid
 4,4'-stilbenedicarboxylic acid
 oxalic acid
 malonic acid
 succinic acid
 glutaric acid
 adipic acid
 pimelic acid
 suberic acid
 azelaic acid
 sebacic acid
 1,12-dodecanecioic acid
 dimethylmalonic acid
 cis-1,4-cyclohexanedicarboxylic acid
 trans-1,4-cyclohexanedicarboxylic acid.

The glycols or mixture of glycols for polyesters (1)(B)(1) and (1)(B)(2) may also be modified by other glycols or a mixture of glycols including, but not limited to:

1,3-trimethylene glycol
 1,4-butanediol
 1,5-pentanediol
 1,6-hexanediol
 1,7-heptanediol
 neopentyl glycol
 1,4-cyclohexanedimethanol (cis and trans isomers and mixtures thereof)
 diethylene glycol,
 1,8-octanediol
 1,9-nonanediol
 1,10-decanediol
 1,12-dodecanediol
 2,2,4,4-tetramethyl-1,3-cyclobutanediol.

The amount of modifying acid or glycol (preferably less than 10 mole percent, more preferably 0.1 to 10 mole %) which may be incorporated in the polyesters (1)(B)(1) and (1)(B)(2) while still achieving a clear, single phase blend depends on the particular acids and glycols which are used.

A preferred embodiment of the acid portion of polyester (1)(B)(1) comprises 2,6-naphthalene dicarboxylic acid and terephthalic acid. The most preferred embodiment comprises 2,6-naphthalene-dicarboxylic acid.

Another preferred embodiment of polyester (1)(B)(2) comprises a blend wherein component 1(B)(2) comprises:

in the acid portion, 100 mole % to 75 mole % terephthalic acid or esters thereof and about 0 to 25 mole % isophthalic acid or esters thereof, wherein the total molar percentages of the acid portion equals 100 mole %, and  in the glycol portion, 100 mole % to 0 mole % ethylene glycol and 0 to 100 mole % 1,4-cyclohexanedimethanol, wherein the total molar percentages of the glycol portion equals 100 mole %.

Polyester (1)(B)(2) of this invention is mixed with the PEN polyester [(1)B(1)] of this invention wherein the weight % of PEN [(1)B(1)] in said mixture and the mole % of cyclohexanedimethanol satisfy the following relationships:

| X = mole percentage of CHDM in said polyester (1)(B)(2) | Approximate Weight % PEN polyester in said mixture |
| --- | --- |
| 0–20 mole % | 5–10 or more |
| 20–50 mole % | 1–5 or more |
| 50–100 mole % | Y or more | wherein Y is approximately=[(0.9) (X)–40].

Using weight percentages of PEN (polyester 1(B)(1)) in the polyester portion of the mixture lower than those specified above generally result in cloudy or opaque ternary blends.

The polyetherimides described herein can be formed, for example, by the reaction of a bis(ether anhydride) of the formula with a diamino compound of the formula:

wherein R' is as described hereinbefore.

Included among the methods of making the polyetherimide are those disclosed in U.S. Pat. Nos. 3,847,867; 3,847,869; 3,850,885; 3,852,242; 3,855,178; 3,887,588; 4,017,511; and 4,024,110. These disclosures are incorporated herein by reference. The I.V. of this polymer is within the range of 0.2 to 1.0, preferably 0.4 to 0.8 dL/g.

A preferable embodiment of this invention comprises (A) about 1% to 50% by weight, preferably 10 to 50 % by weight overall of a polyetherimide and (B) about 99% to weight, preferably 90 to 50% by weight overall of the polyester portion, which is comprised of polyester (1) (B) (1) and polyester (1) (B) (2).

It is more preferred that the polyester portion comprises:

(a) about 20 to 40 % by weight of component 1(B) (1), and (b) 80 to 60 % by weight of component 1(B)(2) based on:
 in the acid component, 100 to 75 mole % terephthalic acid or esters thereof, and, 0 to 25 mole % isophthalic acid or esters thereof, and
 in the glycol component, 50 mole % to 20 mole % ethylene glycol and 50 to 80 mole % 1,4-cyclohexanedimethanol.

The method of the invention involves a method for increasing the heat deflection temperature of a thermoplastic polyester composition comprising melt blending of a polyester of 2,6-naphthalenedicarboxylic acid and the polyetherimide as described herein.

Also, molded articles of the invention can be formed from the blends of the invention wherein the relative amounts of polyetherimide and polyester (1)(B)(1) and (1)(B)(2) are selected to provide that the article has a diffuse transmittance of at least about 40 percent preferably at least about 50 percent more preferably about 60 percent or more when tested in accordance with ASTM D1003.

The mixture of polyetherimide, polyester (1)(B)(1), and polyester (1)(B)(2) may be prepared by any method of mixing known in the art. These blends are preferably compounded in the melt, for example, by using a single screw or twin screw extruder. The three polymer components may be combined in any order. For example, all three may be mixed at once to form the ternary mixture. Additionally, two of the components may be mixed together first, followed by mixing with the third component to form the ternary blend. Other mixing schemes may also be devised, but most preferably, they are all mixed together at once.

Additional components such as stabilizers, fillers, reinforcements, flame retardants, colorants, lubricants, release agents, impact modifiers and the like may also be incorporated into the formulation.

This invention can be further illustrated by the following examples of preferred embodiments thereof, although it will be understood that these examples are included merely for purposes of illustration and are not intended to limit the scope of the invention unless otherwise specifically indicated.

Although the copolyester components of blends are referred to for convenience herein as copolyesters of certain acids and certain glycols, it should be understood that actual syntheses of the copolyesters can employ any equivalent reactants. For example, instead of a diacid, a corresponding anhydride, ester, or acid halide can be employed.

To form the compositions of the examples, polyesters and copolyesters having the compositions listed below were blended with a polyetherimide (PEI). The polyesters and copolyesters were prepared by reacting the dimethyl esters of terephthalic acid (TA) or a mixture of the dimethyl esters of terephthalic acid and isophthalic acid (IA) with ethylene glycol (EG) or with a mixture of ethylene glycol and 1,4-cyclohexane-dimethanol (CG). By 1,4-cyclohexanedimethanol is mean cis and trans isomers and mixtures thereof.

Whenever the term "inherent viscosity" (I.V.) is used in this application, it will be understood to refer to viscosity determinations made at 25° C. using 0.5 gram of polymer per 100 ml of a solvent composed of 60 weight % phenol and 40 weight % tetrachloroethane.

The polyetherimide used in these examples was Ultem 1000™, which is commercially available from General Electric Company. This polyetherimide is essentially the reaction product of 2,2-bis[3,4-dicarboxy-phenoxy)phenyl] propane dianhydride:

and meta-phenylenediamine.

The blends were compounded in the melt on a Werner and Pfleiderer 28 mm twin screw extruder and molded on a Toyo 90 injection molding machine. The heat deflection temperatures (HDT) were measured according to ASTM D648. The results of the HDT measurements are presented in the tables which follow each example. Diffuse transmittance of the injection molded parts was measured according to ASTM D1003. The first two examples below illustrate compositions of the invention.

EXAMPLES

In the following Examples #1 and #2, where applicable, X represents the mole percentage of 1,4-cyclohexanedimethanol in the glycol portion of component 1(B) (2).

When X is present from about 50 to 100 mole %, component 1(B)(1) is present in said blend in the amount of Y weight % wherein $Y=[(0.9)(X) -40]$ or more.

Example 1

Ternary blends were prepared in the melt state and molded. The polyetherimide was Ultem 1000, which is commercially available from General Electric. This polyetherimide is essentially the reaction product of 2,2-bis[2,3-dicarboxy phenoxy phenol] propane dianhydride:

and meta-phenylene diamine, and has an I.V. of 0.57.

A polyester (PEN) was prepared by reaction of the methyl ester of 2,6-naphthalenedicarboxylic acid (NA) with ethylene glycol (EG). A copolyester (PET-CO-PCT) was prepared by reacting the methyl ester of terephthalic acid (TA) with a mixture of 42 mole % ethylene glycol and 58 mole % 1,4-cyclohexanedimethanol. The PEN and PET-co-PCT were first precompounded in a ¾ inch Brabender single screw extruder at 300° C. The ternary blends were then compounded on a 28 mm Werner and Pfleiderer corotating twin screw extruder at 295° C. They were then injection molded at 300° C. Comparative examples of binary PEI/PET-co-PCT blends were also prepared. The amount PEI in the blends was varied from 20% weight to 40% weight. The blend compositions, appearance, and mechanical properties are given in Table 1. All of the blends exhibited a light brown color similar to that of the pure polyetherimide.

In this particular example, X=58, and thus a ternary blend with more than about 12% or more by weight in the polyester portion of PEN will form a clear, solid article. In Example 1B, the overall weight fractions of PET-co-PCT and PEN used were 0.64 and 0.16, respectively. Thus, PEN formed 20%

$$20\% = \left[ \frac{0.16}{0.64 + 0.16} \right] * 100\% \text{ of the polyester}$$

portion. Examples 1C and 1D also utilized 20% PEN in the polyester portion. The comparative Examples 1E, 1F, and 1G utilized no PEN.

The ternary blends of Examples 1B, 1C, and 1D are unexpectedly clear, in contrast to the comparative blends 1E, 1F, and 1G which do not have any PEN and thus are opaque or cloudy. The opaque or cloudy appearance of these comparative blends follows the teaching of U.S. Pat. No. 4,141,927. Compared to the PET-co-PCT control represented by Example 1A, addition of the PEN and PEI results in increased tensile strength at yield, flexural strength and flexural modulus, hardness, and heat deflection temperatures. Clarity of the parts is also maintained. In addition, these blends can be processed at a much lower temperature than that which is required when processing the pure polyetherimide.

Example 2

Blends were prepared with the same polyetherimide and poly(ethylene 2,6-naphthalene-dicarboxylate) as described in Example 1. In this case, the PET-co-PCT copolyester was prepared by reacting the methyl ester of terephthalic acid with a mixture of 28 mole % ethylene glycol and 72 mole % 1,4-cyclohexane dimethanol. The materials were compounded and injection molded in the same manner described in Example 1.

In this particular example, X=72, and thus a ternary blend with more than about 25% or more wt of PEN in the polyester portion will form a clear, solid article. In Example 2B, the overall weight fractions of PET-co-PCT and PEN used were 0.56 and 0.24 respectively. Thus, PEN formed 30%

$$30\% = \left[ \frac{0.24}{0.56 + 0.24} \right] * 100\%$$

of the polyester portion. Examples 2C and 2D also utilized 30% PEN in the polyester portion. The comparative Examples 2E, 2F and 2G utilized no PEN.

The ternary blends of Examples 2B, 2C, and 2D are unexpectedly clear, in contrast to the comparative blends 2E, 2F and 2G which do not have any PEN and thus are opaque. The opaque appearance of these comparative blends follows the teaching of U.S. Pat. No. 4,141,927. Table 2 demonstrates that this composition exhibits similar advantages in mechanical properties to those demonstrated in Example 1.

Example 3

Blends were prepared with the same polyetherimide and poly(ethylene 2,6-naphthalene-dicarboxylate) as described in Example 1. In this case, copolyesters PET-co-PCT with various mole contents of PCT were prepared for blending. The materials were compounded and injection molded in the same manner described in Example 1. The weight percent of PEI in the blend was held constant at 30%.

Figure 1:
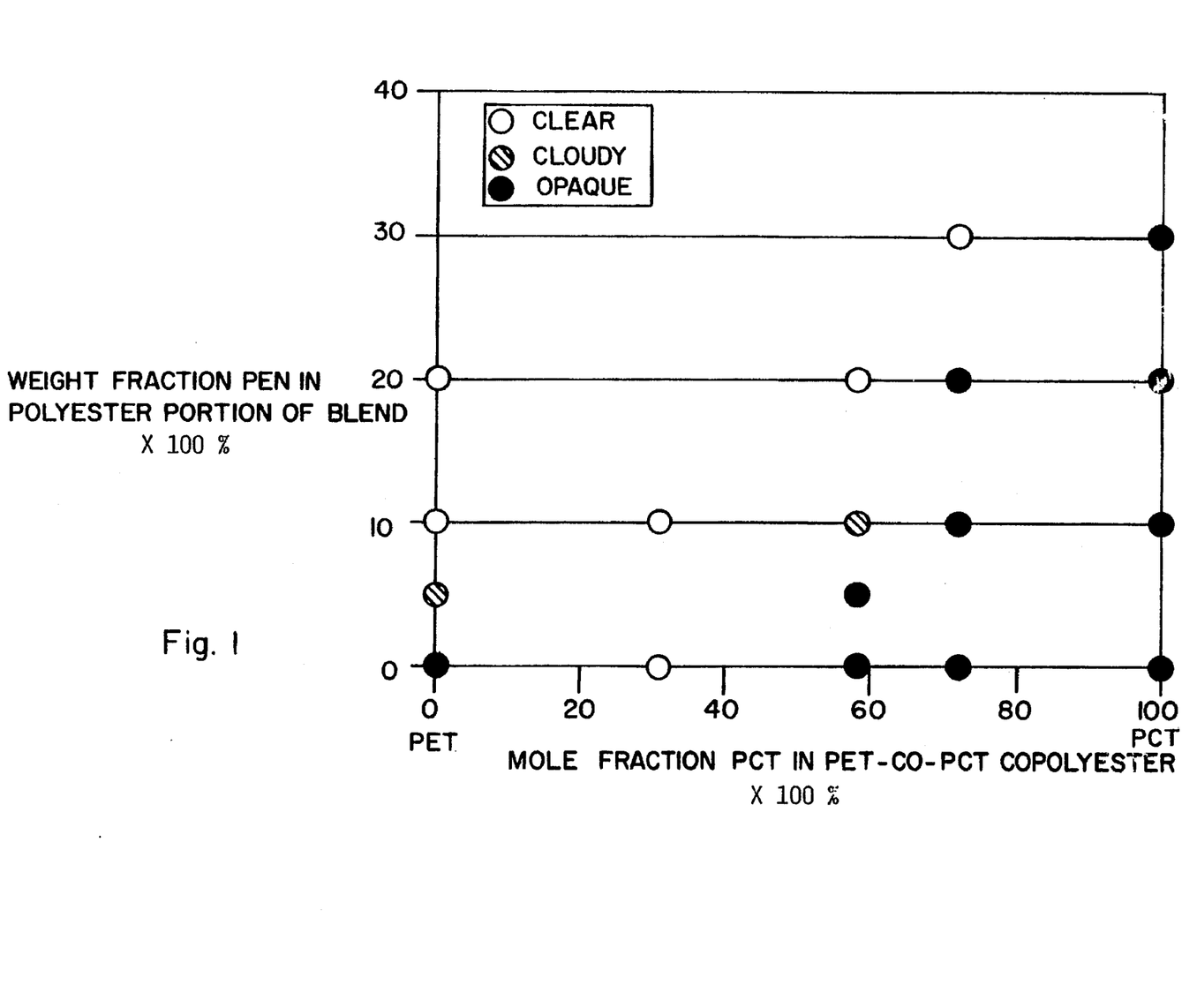

The clarity results for the ternary blends with 30% wt PEI are presented in Table 3. Examples 1C and 2C have been included for completeness. These results are illustrated in the Figure.

Ternary blends in Examples 3C, 3D, 3F, 1C, and 2C exhibit unexpected clarity. The Figure clearly demonstrates that there is generally a critical weight percent of PEN in the polyester portion of the blend which results in a clear material. For example, in the case of PET (Examples 3A, 3B, 3C, 3D) a weight fraction of about 10% or more PEN in the polyester portion is necessary to achieve clarity.

The amount of PEN which results in a clear, three phase blend varies according to the molar composition of the PET-co-PCT copolyester, as described in the disclosure. In the case of a ternary blend where the copolyester was prepared by reacting the methyl ester of terephthalic acid with a mixture of 28 mole % ethylene glycol and 72 mole % 1,4-cyclohexanedimethanol much more PEN must be utilized compared to a ternary blend with PET. Also, when the mole fraction of PCT in the PET-co-PCT copolyester is in the range of 0.20 to 0.40, the use of very little PEN results in a clear blend.

TABLE 1

Properties of PEI/PEN/PET-co-PCT Blends Where the PET-co-PCT Consists of 42 Mole % EG and 58 Mole % CG

| Example | 1A | 1B | 1C | 1D | 1E | 1F | 1G |
|---|---|---|---|---|---|---|---|
| PET-co-PCT Weight Fraction | 1.00 | 0.64 | 0.56 | 0.48 | 0.80 | 0.70 | 0.60 |
| PEN Weight Fraction | 0.00 | 0.16 | 0.14 | 0.12 | 0.00 | 0.00 | 0.00 |
| Total Polyester Content | 1.00 | 0.80 | 0.70 | 0.60 | 0.80 | 0.70 | 0.60 |
| PEI Weight Fraction | 0.00 | 0.20 | 0.30 | 0.40 | 0.20 | 0.30 | 0.40 |
| Appearance | Clear | Clear | Clear | Clear | Opaque | Opaque | Cloudy |
| Diffuse Transmittance (%) | 80 | — | 55 | 51 | 13 | 17 | 31 |
| Tensile Strength @ Yield psi | 6580 | 9380 | 10360 | 11410 | 9260 | 8250 | 10800 |
| Flexural Strength psi | 9040 | 12710 | 14040 | 15630 | 12876 | 11440 | 14730 |
| Flexural Modulus kpsi | 258 | 316 | 342 | 362 | 332 | 309 | 357 |
| Rockwell Hardness: L | 65 | 98 | 104 | 109 | 94 | 86 | 104 |
| HDT @ 66 psi °C. | 69 | 96 | 105 | 115 | 97 | 86 | 111 |
| HDT @ 264 psi °C. | 64 | 85 | 91 | 105 | 83 | 61 | 100 |

TABLE 2

Properties of PEI/PEN/PET-co-PCT Blends Where the
PET-co-PCT Consists of 28 Mole % EG and 72 Mole % CG

| Example | 2A | 2B | 2C | 2D | 2E | 2F | 2G |
|---|---|---|---|---|---|---|---|
| PET-co-PCT Weight Fraction | 1.00 | 0.56 | 0.49 | 0.42 | 0.80 | 0.70 | 0.60 |
| PEN Weight Fraction | 0.00 | 0.24 | 0.21 | 0.18 | 0.00 | 0.00 | 0.00 |
| Total Polyester Content | 1.00 | 0.80 | 0.70 | 0.60 | 0.80 | 0.70 | 0.60 |
| Ultem 1000 Weight Fraction | 0.00 | 0.20 | 0.30 | 0.40 | 0.20 | 0.30 | 0.40 |
| Appearance | Clear | Clear | Clear | Clear | Opaque | Opaque | Cloudy |
| Diffuse Transmittance (%) | 81 | 62 | 64 | 60 | 11 | 5 | 4 |
| Tensile Strength @ Yield psi | 6280 | 9350 | 10600 | 11550 | 7530 | 8140 | 9340 |
| Flexural Strength psi | 8800 | 12900 | 14700 | 16150 | 10740 | 11520 | 13090 |
| Flexural Modulus kpsi | 256 | 316 | 342 | 355 | 294 | 311 | 338 |
| Rockwell Hardness: L | 60 | 98 | 105 | 110 | 76 | 82 | 93 |
| HDT @ 66 psi °C. | 70 | 99 | 109 | 119 | 83 | 91 | 97 |
| HDT @ 264 psi °C. | 65 | 86 | 98 | 106 | 76 | 81 | 89 |

TABLE 3

Clarity Results for Ternary Blends With 30% Wt PEI

| Example | Mole Fraction PCT in PET-co-PCT | PET-co-PCT Weight Fraction | PEN Weight Fraction | Total Polyester Weight Fraction | PEI Weight Fraction | Appearance | Diffuse Transmittance % |
|---|---|---|---|---|---|---|---|
| 3A | 0.00 | 0.700 | 0.000 | 0.70 | 0.30 | Opaque | 19 |
| 3B | 0.00 | 0.665 | 0.035 | 0.70 | 0.30 | Cloudy | 30 |
| 3C | 0.00 | 0.630 | 0.070 | 0.70 | 0.30 | Clear | 67 |
| 3D | 0.00 | 0.560 | 0.140 | 0.70 | 0.30 | Clear | 68 |
| 3E | 0.31 | 0.700 | 0.000 | 0.70 | 0.30 | Clear | 70 |
| 3F | 0.31 | 0.630 | 0.070 | 0.70 | 0.30 | Clear | 69 |
| 3G | 0.58 | 0.700 | 0.000 | 0.70 | 0.30 | Opaque | 17 |
| 3H | 0.58 | 0.665 | 0.035 | 0.70 | 0.30 | Opaque | 27 |
| 3I | 0.58 | 0.630 | 0.070 | 0.70 | 0.30 | Cloudy | 32 |
| 1C | 0.58 | 0.560 | 0.140 | 0.70 | 0.30 | Clear | 55 |
| 3J | 0.72 | 0.700 | 0.000 | 0.70 | 0.30 | Opaque | 5 |
| 3K | 0.72 | 0.630 | 0.070 | 0.70 | 0.30 | Opaque | 4 |
| 3L | 0.72 | 0.560 | 0.140 | 0.70 | 0.30 | Opaque | 2 |
| 2C | 0.72 | 0.490 | 0.210 | 0.70 | 0.30 | Clear | 64 |
| 3M | 1.00 | 0.700 | 0.000 | 0.70 | 0.30 | Opaque | — |
| 3N | 1.00 | 0.630 | 0.070 | 0.70 | 0.30 | Opaque | 2 |
| 3O | 1.00 | 0.560 | 0.140 | 0.70 | 0.30 | Opaque | 1 |
| 3P | 1.00 | 0.490 | 0.210 | 0.70 | 0.30 | Opaque | 1 |

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

I claim:

1. A visually clear blend of thermoplastic polymers comprising:
   (A) a polyetherimide, and
   (B) a mixture of polyesters comprising:
      (1) a polyester comprising repeat units from:
         (a) 2,6-naphthalene dicarboxylic acid and
         (b) ethylene glycol, and
      (2) a polyester comprising repeat units from:
         (a) an acid selected from the group consisting of terephthalic acid, isophthalic acid and mixtures thereof, and
         (b) a glycol selected from the group consisting of ethylene glycol, 1,4-cyclohexanedimethanol and mixtures thereof;

wherein the weight percentages of component (B)(1) and the mole percentages of 1,4-cyclohexanedimethanol in component (B)(2) are present in said polyester portion of the blend as follows:

when said 1,4-cyclohexanedimethanol in the glycol portion of component (B)(2) is present at from about 0.0 to 20 mole %, component (B)(1) is present in said polyester portion of the blend in the amount of 5 to 10 weight % or more;

when said 1,4-cyclohexanedimethanol in the glycol portion of component (B)(2) is present at from about 20 to 50 mole %, component (B)(1) is present in said polyester portion of the blend in the amount of 1 to 5 weight % or more; and when said 1,4-cyclohexanedimethanol in the glycol portion of component (B)(2) is present at from about 50–100 mole %, component (B)(1) is present in said polyester portion of the blend in the amount of Y weight % or more wherein $Y=[(0.9)(X)-40]$ and wherein X represents the mole % of 1,4-cyclohexanedimethanol in the glycol portion of component (B)(2).

2. The blend of claim 1 wherein component (B)(2)(a) is terephthalic acid.

3. A visually clear blend of thermoplastic polymers comprising:

(A) about 95 to 1 weight percent of a polyetherimide having recurring units of the formula:

where n is a whole number greater than 1, the radical —O—R—O is in the 3- or 4- and 3'- or 4'-positions and the radical R is selected from the group consisting of and where m is 0 or 1 and Q is and x is a whole number from 1 to 5, inclusive, the radical —R'— is a divalent organic radical selected from the group consisting of:

(1) aromatic hydrocarbon radicals having from 6 to 20 carbon atoms and halogenated derivatives thereof;

(2) alkylene radicals and cycloalkylene radicals having from 2 to 20 carbon atoms; and (3) radicals of the formula:

where R" is and y is a whole number from 1 to 5, inclusive; and (B) about 99 to 5 weight percent of a mixture of polyesters comprising:

(1) a polyester comprising repeat units from:
   (a) 2,6-naphthalene dicarboxylic acid and
   (b) ethylene glycol, and (2) a polyester comprising repeat units from:
   (a) an acid selected from the group consisting of terephthalic acid or its ester, isophthalic acid or its ester and mixtures thereof, and
   (b) a glycol selected from the group consisting of ethylene glycol, 1,4-cyclohexanedimethanol and mixtures thereof, wherein the weight percentages of component (B)(1) and the mole percentages of 1,4-cyclohexanedimethanol in component (B)(2) are present in said polyester portion of the blend as follows:

when said 1,4-cyclohexanedimethanol in the glycol portion of component (B)(2) is present at from about 0.0 to 20 mole %, component (B)(1) is present in said polyester portion of the blend in the mount of 5 to 10 weight % or more;

when said 1,4-cyclohexanedimethanol in the glycol portion of component (B)(2) is present at from about 20 to 50 mole %, component (B)(1) is present in said polyester portion of the blend in the mount of about 1 to 5 weight % or more; and when said 1,4-cyclohexanedimethanol in the glycol portion of component (B)(2) is present at from about 50–100 mole %, component (B)(1) is present in said polyester portion of the blend in the amount of about Y weight % or more wherein Y=[(0.9)(X)–40] wherein X represents the mole % of 1,4-cyclohexanedimethanol in the glycol portion of component (B)(2).

4. A blend according to claim 3 wherein the component (B)(1) further comprises repeat units from about 0.1 to 10 mole % of a dicarboxylic acid selected from the group consisting of terephthalic acid, isophthalic acid, phthalic acid, 4,4-stilbenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid, trans-1,4-cyclohexanedicarboxylic acid and mixtures thereof.

5. A blend according to claim 4 wherein said polyester of component (B)(1) comprises repeat units from 50 to 90 mole percent 2,6-naphthalenedicarboxylic acid and 50 to 10 mole percent terephthalic acid, isophthalic acid or a mixture of terephthalic acid and isophthalic acid.

6. A blend according to claim 3 wherein (B)(1) further comprises repeat units from about 0.1 to about 10 mole % of a glycol selected from the group consisting of 1,8-octanediol, 1,9-nonanediol, 1,10-decanediol, 1,12-dodecanediol, 2,2,4,4-tetramethyl-1,3-cyclobutanediol, 1,3-trimethylene glycol, 1,4-butanediol, 1,5-pentanediol, 1,6-hexanediol, 1,7-heptanediol, neopentyl glycol, 1,4-cyclohexanedimethanol, diethylene glycol, and mixtures thereof.

7. A blend according to claim 3 wherein component (B)(2) further comprises repeat units from about 0.1 to 10 mole % of a dicarboxylic acid selected from the group consisting of phthalic acid, 4,4-stilbenedicarboxylic acid, oxalic acid, malonic acid, succinic acid, glutaric acid, adipic acid, pimelic acid, suberic acid, azelaic acid sebacic acid, 1,12-dodecanedioic acid, dimethylmalonic acid, cis-1,4-cyclohexanedicarboxylic acid, trans-1,4-cyclohexanedicarboxylic acid, 2,6-napththalene dicarboxylic acid, and mixtures thereof.

8. A blend according to claim 3 wherein component (B)(2) further comprises repeat units from about 0.1 to about 10 mole % of a glycol selected from the group consisting of 1,8-octanediol, 1,9-nonanediol, 1,10-decanediol, 1,12-dodecanediol, 2,2,4,4-tetramethyl-1,3-cyclobutanediol, 1,3-trimethylene glycol, 1,4-butanediol, 1,5-pentanediol, 1,6-hexanediol, 1,7-heptanediol, neopentyl glycol, diethylene glycol, and mixtures thereof.

9. A blend according to claim 3 wherein component (B)(1) comprises repeat units from 2,6-naphthalene dicarboxylic acid and terephthalic acid.

10. A blend according to claim 9 wherein component (B)(2) comprises:

in the acid portion repeat units from, 100 mole % to 75 mole % terephthalic acid or esters thereof and about 0 to 25 mole % isophthalic acid or esters thereof, wherein the total molar percentages of the acid portion equals 100 mole %, and in the glycol portion repeat units from, 100 mole % to 0 mole % ethylene glycol and 0 to 100 mole % 1,4-cyclohexanedimethanol, wherein the total molar percentages of the glycol portion equals 100 mole %.

11. A blend according to claim 3 wherein the radical —R— is a member of the group consisting of:

where Q is a divalent radical of the formula $$-O-,\quad -\overset{O}{\underset{\|}{C}}-,\quad or\quad -C_xH_{2x}-;\ and$$

R" is $$-O-,\quad -\overset{O}{\underset{\|}{C}}-,\quad or\quad -C_yH_{2y}-.$$

12. A blend according to claim 11 where —R— is or

Q is a divalent radical of the formula $-C_xH_{2x}-$, and R" is a divalent radical of the formula $-C_yH_{2y}-$.

13. A blend according to claim 12 where —R— is

—R'— is a divalent organic radical selected from the class consisting of: (1) aromatic hydrocarbon radicals having from 6 to 10 carbon atoms; and (2) alkylene radicals and cycloalkylene radicals having from 2 to 10 carbon atoms.

14. A blend according to claim 11 where R' of the polyetherimide is

15. A blend according to claim 11 comprising 10 to 50 weight % of said polyetherimide and 90 to 50 weight % of said mixture of polyesters.

16. A blend according to claim 15 comprising 20 to 40 weight % of said polyetherimide and 80 to 60 weight % of said mixture of polyesters.

17. A blend according to claim 3 wherein said mixture of polyesters comprises:

(a) about 5 to 32% by weight or more of component (B)(1), and (b) about 95 to 68% by weight or less of component (B)(2) based on:

in the acid component repeat units from, 100 to 75 mole % terephthalic acid or esters thereof, and, 0 to 25 mole % isophthalic acid or esters thereof, and in the glycol component repeat units from, 50 mole % to 20 mole % ethylene glycol and 50 to 80 mole % 1,4-cyclohexanedimethanol.

18. A molded article formed from the blend according to claim 3 wherein the relative amounts of polyetherimide and polyester (B)(1) and (B)(2) are in an amount to produce an article having a diffuse transmittance of at least about 40 percent when tested in accordance with ASTM D1003.

19. The molded article of claim 18 wherein said diffuse transmittance is at least 50 percent when tested in accordance with ASTM D1003.

20. The molded article of claim 19 wherein said diffuse transmittance is at least 60 percent when tested in accordance with ASTM D1003.

21. The molded article of claim 18 wherein the mole percentages of components (B)(2)(a) and (B)(2)(b) are in an amount to produce an article having a diffuse transmittance from at least about 40 percent when tested in accordance with ASTM D 1003.

22. A method for increasing the heat deflection temperature of a thermoplastic polyester composition comprising melt blending said polyester with a polyester of 2,6-naphthalenedicarboxylic acid and a polyetherimide having repeat units of the formula:

wherein —R— is and where m is 0 or 1 and Q is where x is a whole number from 1 to 5, inclusive; and —R'— is a divalent organic radical selected from the group consisting of:

(1) aromatic hydrocarbon radicals having from 6 to 20 carbon atoms and halogenated derivatives thereof;

(2) alkylene radicals and cycloalkylene radicals having from 2 to 20 carbon atoms; and (3) radicals of the formula:

where R" is where y is a whole number from 1 to 5, inclusive, in an amount sufficient to form a single phase solution which is clear and transparent and of higher heat deflection temperature than said polyester.

* * * * *